United States Patent [19]
Makowski et al.

[11] 3,870,841
[45] Mar. 11, 1975

[54] FLEXIBLE POLYMERIC COMPOSITIONS COMPRISING A NORMALLY PLASTIC POLYMER SULFONATED TO ABOUT 0.2 TO ABOUT 10 MOLE % SULFONATE

[75] Inventors: Henry S. Makowski, Robert D. Lundberg, Gopal H. Singhal, all of Westfield, N.J.

[73] Assignee: Exxon Research and Engineering Company, Linden, N.J.

[22] Filed: Oct. 2, 1972

[21] Appl. No.: 294,489

[52] U.S. Cl... 260/23.7 R, 117/132 C, 117/132 CB, 260/23.7 M, 260/30.6 R, 260/30.8 R, 260/32.6 R, 260/32.6 A, 260/33.4 R, 260/79.3 R, 260/DIG. 31
[51] Int. Cl... C08f 27/06, C08d 11/02, C08d 13/30
[58] Field of Search .. 260/23.7 R, 23.7 M, DIG. 31, 260/78.5 T, 79.3 R, 23.7 S

[56] References Cited
UNITED STATES PATENTS

| | | | |
|---|---|---|---|
| 2,416,050 | 2/1947 | McAlevy | 260/23 |
| 2,669,550 | 2/1954 | Brown | 260/23.7 |
| 2,671,074 | 11/1950 | Brown | 260/80.7 |
| 3,264,272 | 8/1966 | Rees | 260/78.5 |
| 3,404,134 | 10/1968 | Rees | 260/78.5 |
| 3,642,728 | 2/1972 | Canter | 260/79.3 R |

Primary Examiner—Ronald W. Griffin

[57] ABSTRACT

Flexible polymeric compositions are prepared by introducing sulfonate groups into a plastic polymer and plasticizing the ionomer so formed. Plasticization may be limited to plasticizing the amorphous backbone. Preferably the ionic domains of the ionomer are also plasticized using a plasticizer which is effective at processing temperature but ineffective at use temperature.

The products of this invention are flexible and have utility as simulated leathers, wire coating insulation, etc.

47 Claims, No Drawings

FLEXIBLE POLYMERIC COMPOSITIONS COMPRISING A NORMALLY PLASTIC POLYMER SULFONATED TO ABOUT 0.2 TO ABOUT 10 MOLE % SULFONATE

BACKGROUND OF INVENTION

Hard, rigid thermoplastic materials can be softened by the addition of solvents. In totally amorphous thermoplastics the strength of the plastic-solvent composition decreases with increasing solvent concentration to a point where the composition possesses a high degree of flow at room temperature and above, and possesses little or no strength. Solvents for polymers which are designed for use in softening the rigid thermoplastic are normally high boiling and highly compatible with the polymer system. Such solvents are normally referred to as plasticizers.

It is well known that thermoplastics which possess no crystallinity can be mixed with compatible plasticizers at levels where the glass transition temperature of the mixture is below room temperature, i.e., the composition is flexible at room temperature. Since there are no forces holding the polymer chains together, the mixture is simply a viscous fluid and possesses little strength.

It is also well known that polyvinyl chloride can be converted from a stiff thermoplastic to products which are not only flexible but possess high strength by the incorporation of suitable amounts of suitable plasticizers. Plasticized polyvinyl chloride compositions possess strength in their plasticized form because the polyvinyl chloride chains are physically cross-linked, or tied together, by virtue of the fact that polyvinyl chloride is partly crystalline. Polyvinyl chloride possesses two major thermal transitions, one corresponding to its glass transition temperature and the other corresponding to its crystalline melting point. When plasticizer is added to polyvinyl chloride it primarily affects the amorphous (i.e., noncrystalline) region and lowers the glass transition temperature of the bulk of the polymer. The plasticizer does in fact have some effect on the crystalline region. The thermal transition corresponding to the melt temperature is markedly reduced so that the plasticized polymer cannot be used at high temperatures. Nevertheless sufficient crystallinity remains for the plasticized composition to possess high strength at around room temperature. Once the crystallinity disappears (by the inclusion of more plasticizer or by raising the temperature) the plasticized PVC behaves as a viscous liquid and possesses little strength just as other plasticized, totally amorphous thermoplastics.

An excellent example of a thermoplastic which contains no crystallinity is atactic polystyrene, the conventional commercial material. Numerous attempts have been made to plasticize this polymer to a clear, flexible strong product by the addition of substantial amounts of nonvolatile solvents. These attempts have been uniformly unsuccessful. To overcome the problems of low strength and cold flow associated with the plasticized versions of polystyrene, a number of approaches have been taken. One of these involved copolymerization of chlorostyrene to create semi-crystalline polymers. (See, for example, U.S. Pat. No. 3,224,934.) Plasticization of these materials resulted in flexible products of low strength. Obviously this is an expensive procedure; furthermore, the resulting plasticized systems were extremely weak. Nevertheless the aforementioned patent demonstrates the efforts which have been directed towards attainment of a high-strength plasticized polystyrene.

Another approach [(Erdi and Morawetz; J. Colloid Sci, 19, 708–721 (1964)] has involved the copolymerization of carboxylic acid containing monomers with styrene, followed by neutralization to create metal carboxylate groups (about 2 to 5 mole percent). Attempts were made to plasticize these systems. Even at plasticizer contents of only 25 %, these products demonstrated cold flow much like plasticized homopolystyrene. Specifically the authors employing this approach state: "In conclusion, it must be admitted that we are far from the goal of modifying polystyrene so as to produce an elastic gel with an essentially permanent network structure."

DETAILED DESCRIPTION

This invention relates to the conversion of substantially amorphous the thermoplastics ordinarily incapable of plasticization to strong, flexible products, to materials which are fully capable of plasticization to high strength, flexible compositions. More specifically, this invention relates to the achievement of that end through the introduction of relatively minor amounts of sulfonate groups into the thermoplastic molecules and through the addition of plasticizer to the sulfonate containing polymer. Sulfonate groups can be introduced in a wide variety of ways which generally fall into four major categories.

I. Copolymerization with Sulfonate Containing Monomers

For example, alkali metal salts of styrene sulfonic acid can be copolymerized using free radical initiators with a variety of thermoplastic forming monomers such as styrene, t-butyl styrene, chlorostyrene, and the like.

II. Direct Sulfonation of Homopolymers

Sulfonic acid groups can be introduced into aromatic homopolymers such as polystyrene, polyvinyl toluene, poly-alpha-methyl styrene, poly-t-butyl styrene, and the like by direct reaction with a sulfonating agent. Sulfonating agents such as sulfuric acid and chlorosulfonic acid can be used. Preferred sulfonating agents are acetyl sulfate, i.e., the mixed anhydride of acetic acid and sulfuric acid ($CH_3COOSO_3H$), and sulfur trioxide complexes with dioxane, tetrahydrofuran, and trialkyl phosphates. Of the trialkyl phosphate complexes those consisting of trialkyl phosphate/$SO_3$ ratios of about 1.0 are most preferred.

III. Direct Sulfonation of Modified Polymers

Where desirable homopolymers cannot be directly reacted to produce sulfonate containing materials it is possible to introduce by copolymerization functional groups capable of reacting with sulfonating agents. The two most desirable functional groups for this purpose are double bonds and aromatic groups, especially phenyl groups; See U.S. Pat. No. 3,642,728 incorporated herein by reference for methods of sulfonating polymers containing olefinic unsaturation.

A. Copolymers of Aromatic Monomers

Copolymerization of vinyl monomers and relatively small amounts of styrene or other vinyl aromatics reactive to sulfonating agents produces copolymers with essentially homopolymeric properties capable of being sulfonated. Illustrative examples of such copolymers are chlorostyrene-styrene, styrene-acrylonitrile, styrene-vinyl acetate, etc. In non-vinylic polymer systems an aromatic group can be introduced into the polymer through the use of an aromatic containing monomer, e.g., phenyl glycidyl ether copolymerized with propylene oxide. The reagents suitable for introducing sulfonic acid groups directly are the same as those described for the direct sulfonation of homopolymers (II).

B. Polymers Containing Unsaturation

Although unsaturation may be introduced into homopolymers in a number of ways, copolymerization with a conjugated diolefin generally can be relied on to produce thermoplastic materials containing small amounts of unsaturation. Suitable comonomers for the incorporation of unsaturation in vinyl polymers are conjugated diolefins, such as butadiene, isoprene, dimethyl butadiene, piperylene and non-conjugated diolefins, such as allyl styrene. Copolymers can be made by using any of the applicable initiating systems, i.e., free radical, cationic, anionic, or coordinated anionic. In polyethers unsaturation can be introduced by copolymerization with unsaturated epoxides, e.g., allyl glycidyl ether.

The reagents which are suitable for the direct introduction of sulfonic acid groups into unsaturated thermoplastics are the complexes of $SO_3$ with reagents such as dioxane, tetrahydrofuran, trialkyl phosphates, carboxylic acids, trialkylamines, pyridine, etc. Especially suitable are the trialkyl phosphate complexes, and the most preferred are the 1/1 complexes of $SO_3$/triethyl phosphate.

IV. Oxidation of Sulfur Containing Functional Groups

Polymers which contain sulfinic acid groups can be readily air oxidized to sulfonic acids. Polymers containing mercaptan groups can be easily converted to the sulfonic acid groups through oxidation of the mercaptan groups with a variety of oxidizing agents, such as hydrogen peroxide, potassium permanganate, sodium dichromate, etc.

The term "sulfonated" when used with reference to the polymers of this invention is intended to include both the sulfonated polymers produced by copolymerization with a sulfonate, e.g., styrene and styrene sodium sulfonate or 2-sulfo ethyl methacrylate and polymers sulfonated by means of a sulfonation agent, e.g., acetyl sulfate, $SO_3$ complexes of Lewis bases, etc.

The base polymers suitable for use in the practice of this invention, i.e., the thermoplastics devoid of sulfonate groups, are any thermoplastics which possess a softening point (glass transition temperature) of between about 25°C., preferably about 35°C., and about 260°C., preferably 150°C. Base polymers having weight average molecular weights of from about 5000 to 500,000, and higher, are applicable in the instant invention. The base polymers can be prepared directly by any of the known polymerization processes, or they can be obtained by modification of another polymer, e.g., hydrogenation of a butadiene-styrene copolymer. The term "thermoplastic" is used in its conventional sense to mean a substantially rigid (flexural modulus > 10,000 psi) material capable of retaining the ability to flow at elevated temperatures for relatively long times.

In the preparation of the base polymers by direct addition polymerization processes, the chief monomeric component can be chosen from the following:

1. Alpha-olefins, such as styrene, vinyl toluene, t-butyl-styrene, alpha-methyl styrene, chlorostyrene, vinyl cyclohexane, 1,6-heptadiene, and the like.
2. Acrylates and methacrylates, such as methyl methacrylates.
3. Vinyl acylates, such as vinyl acetate.
4. Alkylene oxides, such as styrene oxide.
5. Vinyl halides, such as vinyl chloride.
6. Nitrile containing monomers, such as acrylonitrile and methacrylonitrile.
7. Cyclic monomers, such as oxacyclobutane, tetrahydrofuran, trimethylene sulfide, lactones, e.g. caprolactone.
8. Aldehydes, such as formaldehyde, acetaldehyde.
9. Vinyl alkyl ethers.

Base polymers prepared by condensation processes, such as polyesters, polyanhydrides, polyamides, polycarbonates, etc. are also suitable for use in the practice of this invention. Preferably the base polymers are the polyvinyl aromatics, most preferably polystyrene, poly-t-butyl styrene, polyvinyl toluene, and poly-alpha-methyl styrene.

The introduction of sulfonic acid groups is sufficient to provide for ionic interactions between the polymer chains and thereby permit the effective plasticization of the polymer to high strength, flexible compositions. However, since sulfonic acids do not possess high thermal stability and since the salts of sulfonic acids are considerably more ionic than the acids, it is especially preferred to convert the sulfonic acid to a metal salt. Preferably, the salts are prepared from the metals in Groups IA, IIA, IB, and IIB and also lead, tin, antimony. Most preferably the salts are those of sodium, potassium, and barium. Additionally, ammonia mono-, di- and tertiary amine salts may be utilized in the practice of this invention, e.g. ethylamine salts, diethylamine salts, trimethylamine salts; See U.S. Pat. No. 3,642,728 incorporated herein by reference for a broad disclosure of neutralizing agents for the sulfonic acids.

A wide variety of properties can be obtained through variations in the base polymer, the sulfonate level, the type of metal salt, and the type and level of chain plasticizer. Only small amounts of sulfonate are necessary to impart desirable properties. Desirable compositions are obtained with polymers containing about 0.2 to about 10 mole percent sulfonate, preferably about 0.5 to about 6 mole percent; more preferably about 1.0 to about 3.0 mole percent. Mole percent sulfonate is herein defined as Number of Sulfonate Groups 100 Monomer Units Unplasticized metal sulfonate containing thermoplastics, depending upon the sulfonate level and counterion, are extremely difficult to process even at relatively low sulfonate levels and substantially elevated temperatures, i.e., they possess extraordinarily high viscosities. It is possible to improve the processing of these materials through the addition of preferential plasticizers, i.e., materials which primarily relax ionic bonds and therefore disrupt the ionic domains of the metal sulfonate containing polymer. (See, for example, U.S. patent application Ser. No. 103,902, now abandoned, incorporated herein by reference.) To distinguish the plasticizer employed for the ionic domain from the plasticizer employed for the thermoplastic backbone, the plasticizer for the ionic domain will be referred to as the "domain plasticizer" and the plasticizer for the thermoplastic backbone will be referred to as the "chain plasticizer".

In order that the plasticized compositions possess good physical properties at normal use temperatures, the sulfonate group must exert an associative or physical cross-linking effect. On the other hand, in order for the compositions to be processable at a given temperature, the ionic bonding must be disrupted at processing temperatures. It is the function of the "domain plasticizer" to reversibly disrupt the ionic bonds so that the polymer is readily worked at processing temperature but has the physical integrity resulting from ionic bonding at use temperatures.

It is another aspect of this invention that it is possible to control chain plasticization and domain plasticization independently, or to choose the chain plasticizer to function both as a backbone plasticizer and an ionic domain plasticizer. Clearly each of these systems has advantages. In the case of the independent control of chain and ionic domain plasticization the low temperature properties can be varied while still maintaining high use temperatures. Where the chain and ionic domains are both affected by the plasticizer, simpler systems result.

The chain plasticizer for the system is a relatively nonvolatile liquid which solvates the backbone of the sulfonate containing thermoplastic. By "nonvolatile" is meant that the normal boiling point of the liquid is at least about 120°C., preferably the boiling point of the chain plasticizer is at least 150°C.; more preferably at least 200°C. If the plasticizer is too volatile the plasticized product would lose plasticizer with a resulting undesirable change in physical properties. Therefore, liquids with low vapor pressures are desired.

The solubilities of many polymeric systems in a wide variety of solvents are generally well known, and therefore chain plasticizer activity can generally be predicted on the basis of solubility parameters. However, where solubility characteristics have not been established, chain plasticizers for this invention may be selected by the following simple test. One gram of unmodified polymer is combined with 100 grams of prospective chain plasticizer and heated to a temperature near or above the softening point of the polymer and then cooled to room temperature. If the polymer dissolves under these conditions the liquid medium will make an acceptable chain plasticizer for the system.

As a general rule, esters and glycolates are satisfactory as plasticizers, e.g., di($C_3$–$C_{13}$) phthalates; $C_2$–$C_6$ esters of $C_{12}$–$C_{18}$ organic acids and alcohols; polyesters derived from aliphatic glycols and aliphatic debasic acids wherein the ratio of methylene groups to oxygen is at least 5.

Preferred plasticizers for sulfonated vinyl aromatic polymers and copolymers are di-n-hexyl adipate, dicapryl adipate, di-(2-ethyl hexyl) adipate, dibutoxy-ethyl adipate, benzyloctyl adipate, tricyclohexyl citrate, butyl phthalyl butyl glycolate, butyl laurate, n-propyl oleate, n-butyl palmitate, dibutyl phthalate, dihexylphthalate, dioctylphthalate, tributyl phosphate, dioctyl sebacate and mixtures thereof.

The preferred plasticizers for polymers and copolymers of alkyl styrenes, e.g., t-butyl styrene are octyl decyl adipate, didecyl adipate, di-2-ethylhexyl azelate, butyl laurate, n-butyl myristate, amyl oleate, isooctyl palmitate, didecyl phthalate, ditridecyl phthalate, decyl tridecyl phthalate or mixtures thereof. Surprisingly, hydrocarbons such as petroleum based oils may be used as chain plasticizers for the poly alkyl styrenes. The conventional rubber process oils as described in ASTM D2226-70 as extender oils are suitable for this use. Illustrative examples of extender oils are tabulated below.

TABLE I

| ASTM TYPE | EXTENDER OILS VISCOSITY SSU (100°F.) | ANILINE POINT, °F. |
|---|---|---|
| | Aromatic | |
| 102 | 3900 | 100 |
| 102 | 126 | 95 |
| 102 | 4010 | 124 |
| | Naphthenic | |
| 103 | 1253 | 174 |
| 103 | 1855 | 173 |
| 103 | 145 | 160 |
| 103 | 104 | 169 |
| 103 | 203 | 179 |
| 103 | 510 | 190 |
| 103 | 6090 | 242 |
| 103 | 5512 | 252 |
| 104A | 204 | 199 |
| 104A | 505 | 216 |
| 104A | 1060 | 230 |
| | Paraffinic | |
| 104B | 105 | 186 |
| 104B | 332 | 233 |
| 104B | 2650 | 262 |

Generally any nonvolatile normally liquid hydrocarbon may be used as a chain plasticizer for the alkylstyrene polymers and copolymers. The synthetic oils such as polyesters and isoparaffins produced as a by-product of isooctane manufacture are also suitable as chain plasticizers. The term "extender oil" are used in the specification and claims means chain plasticizers which can be classified as nonvolatile normally liquid hydrocarbons and which meet the chain plasticizer solubility test set forth above.

Generally any of the normally liquid compounds listed in *Materials and Compounding Ingredients for Rubber*, Rubber World, New York, 1968, incorporated herein by reference and classified in the sections entitled "Plasticizers and Softeners" and "Processing Acids and Dispersing Agents" may be used as chain plasticizers provided that they meet the solubility test described above. The term "normally liquid" means compounds which are fluids at room temperature, e.g., ca. 25°C.

Chain plasticizers which are especially preferred for sulfonated polyvinyl acetate are dinonyl adipate, triethyl citrate, dioctyl fumarate, di-n-butyl maleate, tributyl phosphate, tricresyl phosphate, diethyl phthalate, di-butyl phthalate, dicyclohexyl phthalate, dihexyl phthalate or mixtures thereof.

Many of the chain plasticizers mentioned above not only suitably plasticize the polymer backbone but also exert an effect on the ionic domains in the polymer. The extent to which this effect is exerted is determined by both the nature of the plasticizer and the plasticizer concentration. Phthalate esters are good examples. Dibutyl phthalate exerts a large effect on the ionic domains while dioctyl phthalate exerts less and ditridecyphthalate practically none. It is then clear that by proper choice of sulfonate level and plasticizer type and concentration it is possible to produce plasticized polymeric compositions with a wide variety of useful properties.

In the independent control of chain plasticization and ionic domain plasticization, the ionic domain plasticizer may be volatile or it may be nonvolatile. The major practical difference between the two is that the nonvolatile plasticizers remain with the final product while the volatile plasticizers are evolved from the ionomer once they have performed their function. A volatile plasticizer hereinafter referred to as "fugitive plasticizer" is a material which, when added to the polymer, relaxes the ionic interactions and permits the polymer composition to be processed across the range of temperatures from the softening point of the polymer to the actual boiling point of the fugitive domain plasticizer and then is easily removed from the composition. The term "volatile" means compounds having a normal boiling point of less than 120°C. Typical examples of fugitive domain plasticizers include water, alcohols such as methyl alcohol, isopropyl alcohol, n-butyl alcohol, etc., phosphorous-containing compounds such as triethyl phosphate, amines such as ethylamine and triethylamine, thiols such as ethanethiol, etc. Once the plasticized composition has been processed to the desired article, the volatile domain plasticizer is then partially or totally removed by subjecting the article to heat or vacuum or both. The fugitive plasticizer is incorporated into the composition at about 1 to about 50 wt. percent based on sulfonated polymers, more preferably, about 1 to about 20 wt. percent.

The second types of domain plasticizer are the nonvolatile plasticizers. There are two kinds of nonvolatile plasticizers. First there is one which functions exactly as the volatile plasticizer but remains permanently with the plasticized composition. This kind of nonvolatile domain plasticizer will be referred to as a nonvolatile permanent domain relaxer. By proper control of the polarity and concentration of the nonvolatile permanent domain relaxer along with the sulfonate content of the polymer it is possible to prepare compositions with desirable properties at use temperatures and yet which can be processed at elevated temperatures.

Generally any nonvolatile compound containing a functional group having a bond moment of at least 0.6 Debyes is useful as a non-volatile permanent domain relaxer. These domain plasticizers have a solubility parameter of at least 9.5, preferably 10.5 or greater, and a boiling point or sublimation point of at least 120°C., preferably at least 150°C., more preferably at least 200°C. The compounds for use are normally liquid but may be solid and are used at levels of less than 25 parts by weight per hundred parts of polymer, preferably about 1 to about 20 parts, more preferably about 1 to about 10 parts. Excessive use, e.g., greater than 25 parts, leads to a virtually complete loss of physical properties. Generally non-volatile permanent domain relaxers are more useful with the higher sulfonate containing polymers.

Examples of non-volatile permanent relaxers are as follows:

Oxygen Containing Compounds:

Alcohols and phenols, such as benzyl alcohol, phenol, resorcinol, glycerol, nonyl phenol, sorbitol, etc. Carboxylic acids such as butyric acid, dichloracetic acid, phenyl acetic acid, neopentanoic acid, stearic acid, oleic acid, etc. Carboxylic acid esters, such as phenyl benzoate, dimethyl sebacate, dimethyl phthalate, etc. Carboxylic acid amides, such as N-methyl acetamide, N,N-diethyl benzamide, N-phenyl propionamide, etc.

Nitrogen Containing Compounds:

Amines, such as piperazine, diphenylamine, phenyl-2-naphthyl amine, nitrogen heterocycles such as picoline, quinoline, etc. Alkylated ureas, such as tetramethyl urea. Guanidine derivatives such as diphenyl guanidine and di-o-tolyl guanidine.

Sulfur Containing Compounds:

Sulfonamides, such as N-ethyl toluene sulfonamide. Sulfones, such as diethyl sulfone, dimethyl sulfone. Sulfonates, such as n-hexyl toluene sulfonate.

Phosphorus Containing Compounds:

Phosphates, such as triphenyl phosphate. Phosphites, such as tris-(3,5-dimethyl phenyl)-phosphite. Phosphonates, such as dibutyl phenyl phosphonate. Phosphonamides, such as N,N-dimethyl phenyl phosphonamide. Phosphoramides, such as hexamethyl phosphoramide.

The second kind of nonvolatile domain plasticizers will be referred to as the nonvolatile-nonpermanent domain relaxers. These plasticizers are solids which have melting points or reversible decomposition points which are substantially above room temperature, i.e. at least about 35°C., preferably at least about 45°C., and more preferably at least about 55°C. These domain relaxers exhibit an ionic domain relaxation effect at higher processing temperatures, but at lower use temperatures the plasticizer possesses a considerably reduced effect so that the ionic associations may reform. The mechanism of operation of these nonpermanent domain relaxers is not known but probably related to the type of metal sulfonate, the type of nonpermanent domain relaxer, and the melting point or decomposition point of the nonpermanent domain relaxer. Useful nonvolatile-nonpermanent domain relaxers are the lead, tin, antimony and Groups IA, IIA, IB, and IIB metal carboxylates, sulfonates, and phosphonates, such as calcium stearate, zinc laurate, magnesium ricinoleate, potassium benzene sulfonate, disodium tolyl phosphonate, as well as hydrated or alcoholated salts, such as $Li_2SO_3.H_2O$, $(NH_4)_2SO_4.Ce(SO_4)_3.8H_2O$, $(NH_4)Cr(SO_4)_2.12H_2O$, etc.

The nonpermanent domain relaxers are used at the substantially same levels as the nonvolatile permanent domain relaxers, e.g., less than 25 parts by weight, preferably about 1 to about 20 parts by weight, more preferably 0.25 to about 10 parts by weight based on the polymers, most preferably about 0.3 to about 5 parts, e.g., 1-4 parts.

The chain plasticizer may be added to the polymer at about 20 parts to about 500 parts by weight based on the polymer, preferably 25 parts to 250 parts, per 100 parts of the polymer, more preferably about 30 to about 100 parts. An upper limit of plasticizer content depends upon the physical properties of the fabricated object. The exact amount of plasticizer added to the system depends upon the desired properties. The desired properties can be obtained through the use of different plasticizers at different concentrations, different base polymer compositions, different levels of sulfonate groups, and different combinations of chain and ionic domain plasticizers.

EXAMPLE 1

To a polymerization vessel under anhydrous and anaerobic conditions was charged 350 ml. benzene, 0.374 meq. of n-butyllithium, and 3.74 meq. of anisole. The solution was heated to 38°C., and 48.1g. (0.30 mole) of purified t-butyl styrene was added. The solution was stirred for 1 hour at about this temperature. Then 2.0 ml. of allyl bromide was added, and the solution titrated for excess base to determine the terminal carbon-lithium content. There was found 0.195 meq. of carbon-lithium. Therefore, the average degree of polymerization achieved was 1538 for a number average molecular weight of 246,000. The polymer was precipitated with methanol, filtered and thoroughly washed with methanol, and vacuum oven dried. The yield was 46.9 g.

On a steam heated rubber mill was added to the polymer an oil containing 13% aromatics, 26.5% paraffins, 60.5% naphthenes, and having a specific gravity (60/60°F.) of 0.8586. In one case 30 parts of oil was added per 100 of the poly-t-butyl styrene, and in the other case 60 parts of oil was added. Small test pads were compression molded. The composition containing 30 parts of oil was very brittle and weak and it was not possible to prepare dumbbell specimens for testing. The composition containing 60 parts of oil showed virtually no strength when tested with an Instron machine, i.e. the compositions flowed on pulling the dumbbell specimen.

This example demonstrates that a totally amorphous thermoplastic containing no highly polar or ionic groups, such as n-butyl-lithium polymerized t-butyl styrene, possesses little or no strength when sufficient plasticizer is added to make the composition soft at room temperature.

EXAMPLE 2

Preparation of Base Polymer

To a polymerization vessel under anhydrous and anaerobic conditions was charged 900 ml. benzene, and 0.888 meq. of n-butyllithium. The solution was heated to 55°C., and 199.9 g. of a solution of 4.0 mole percent isoprene and 96.0 mole percent t-butyl styrene was added in 10 ml. increments every 3 minutes. The solution was stirred at a maximum temperature of 65°C. after all the monomers had been added for a total of 90 minutes reaction time. The reaction was terminated by the addition of methanol, and the copolymer was isolated by methanol precipitation, stabilized with 2,6-di-t-butyl catechol, and vacuum oven dried. Yield was 199.2 g.

The copolymer was analyzed for unsaturation by the iodine-mercuric acetate method. An iodine number of 9.76 cg. iodine/g. polymer was obtained which corresponds to 4.01 mole percent isoprene.

Sulfonation and Neutralization of Base Polymer

A sulfonating agent was prepared by mixing 1.5 ml. $SO_3$ and 6 ml. of triethyl phosphate in 120 ml. of methylene chloride. Twenty grams of the isoprene-t-butyl styrene copolymer was dissolved in 100 ml. methylene chloride. To this solution was added 15.77 ml. of the sulfonating agent, and the solution was stirred for 2.5 hours. To the solution was then added a drop of phenolphthalein indicator, anti-oxidant (2,6-di-t-butyl catechol), and 17.45 meq. sodium hydroxide dissolved in water. The mixture was stirred at room temperature for 1 hour and an additional 2 hours at reflux, but the pink color of the indicator did not disappear.

The sulfonate-containing polymer was isolated by steam stripping. The resultant polymer was cut into small pieces, heated in hot water for 30 minutes, filtered, washed with water, and vacuum oven dried at 70°–80°C. The dried polymer was redissolved in 250 ml. of methylene chloride and 3 ml. methanol. The polymer was reprecipitated in methanol. The polymer was filtered, washed with methanol, and vacuum oven dried at 70°C. Yield was 19.5 g.

Analysis of the polymer showed it to contain 0.78 weight percent sulfur and 1.5 weight percent sodium. On the basis of these analyses, the sodium sulfonate-containing polymer contains about 4.4 sodium sulfonate groups per 100 monomer units.

Plasticization of the Polymer

5 Grams of the sodium sulfonate-containing polymer was dissolved in 30 ml. benzene (containing 0.1% 2,6-di-t-butyl catechol) and 2 ml. methanol. To this solution was added 5.0 g. of an oil having an average molecular weight of about 500 by vapor pressure osmometry, based on paraffinic and naphthenic hydrocarbons with a specific gravity at 15.6°C. of 0.885, and with a kinematic viscosity measured at 20°C. of 240 centistokes, and a refractive index at 20°C. of 1.4823. The solution was evaporated in a shallow pan in vacuum oven at about 80°C. The resultant flexible film was homogenized for 8 minutes at 300°F. on a steam-heated rubber mill.

A film of the plasticized composition was prepared by compression molding at 400°F. which was clear and did not exude plasticizer. Stress-strain properties were obtained on microdumbbells cut from the film. The composition had a tensile strength of 513 psi. and an elongation of 285%.

This example illustrates that strong, flexible compositions can be obtained with sodium sulfonate-containing poly-t-butyl styrene and a relatively nonpolar oil at a level of 100 parts of oil per 100 parts of sodium sulfonate-containing polymer. Even though the plasticizer was relatively nonpolar, the plasticized composition could still be molded at 400°F. in the absence of ionic domain plasticizers. This example then demonstrates that sodium sulfonate poly-t-butyl styrene at lower levels of sodium sulfonate and containing relatively nonpolar plasticizer can still be processed at elevated temperatures and possess good strength and properties at room temperature or the use temperature for the plasticized composition.

EXAMPLE 3

The sodium sulfonate poly-t-butyl styrene of Example 2 was mixed with 100 parts of dioctyl phthalate per 100 parts of polymer and films obtained by compression molding according to the procedures described in Example 2. The plasticized composition possessed a tensile strength of 58 psi. and an elongation of 625%.

This example when compared with Example 2 shows that a chain plasticizer, which imparts flexibility to the composition, can also have an effect on the ionic domains.

EXAMPLE 4

A potassium sulfonate containing poly-t-butyl styrene was prepared from the same base polymer as described in Example 2 and essentially the same procedure with the exception that potassium hydroxide was used in the neutralization. Analysis of the polymer showed it to contain 0.76 weight percent sulfur and 1.22 weight percent potassium. On the basis of these analyses then the potassium sulfonate containing polymer contains about 4.4 potassium sulfonate groups per 100 monomer units.

The polymer was mixed with 100 parts of an oil (described in Example 2) and films obtained by compression molding according to the procedures described in Example 2. The plasticized composition showed a tensile strength of 579 psi. and an elongation of 355%. This example illustrates the use of potassium as counterion in the metal sulfonate.

EXAMPLE 5

The polymer of Example 4 was mixed with 100 parts of dioctyl phthalate per 100 parts of polymer and films obtained by compression molding according to the procedures described in Example 2. The plasticized composition possessed a tensile strength of 58 psi. and an elongation of 550%.

EXAMPLE 6

Preparation of t-Butyl Styrene-Isoprene Copolymer

To a polymerization vessel under anhydrous and anaerobic conditions was charged 1000 ml. benzene and 0.984 meq. of n-butyl-lithium. The solution was heated to about 50°C., and 199.4 g. of a solution of 15 mole percent isoprene and 85 mole percent t-butyl styrene was added in 10 ml. increments. The typical orange color of the t-butyl styryl lithium disappeared upon addition of monomer increment and then reappeared at which point another 10 ml. increment was added. After total monomer addition and additional stirring at about 50°C., reaction was terminated by the addition of methanol and about 0.2 g. of di-t-butyl catechol. The copolymer was isolated by methanol precipitation, filtered, washed with methanol, and vacuum oven dried at about 60°–80°C.

Two identical runs were prepared. They were combined by solution blending and precipitation with methanol. Overall yield of combined products was 386 g.

The copolymer was analyzed for unsaturation by the iodine-mercuric acetate method. An iodine number of 33.1 cg. iodine/g. polymer was obtained, which corresponds to 14.8 mole percent isoprene.

Sulfonation of the T-Butyl Styrene-Isoprene Copolymer 100 grams of the copolymer was dissolved in 1 liter of methylene chloride, and to the solution was added, with stirring over a 10-minute period, 100 ml. of the sulfonating mixture prepared by adding 5.1 ml. of sulfur trioxide to a solution of 20.8 ml. triethyl phosphate in 174 ml. of methylene chloride. The clear solution was stirred for 2.5 hours and then poured into 5 liters of methanol. No precipitate of polymer was obtained so the turbid solution was evaporated and the residue was thoroughly dried.

To a solution of 25 g. of the sulfonate copolymer in 150 ml. benzene and a few drops of methanol was added 62.5 meq. of sodium hydroxide in methanol. To the mixture 10 ml. of 5% 2,6-di-t-butyl catechol in methanol was added, and the mixture was stirred overnight. The polymer was precipitated by pouring the mixture into stirred hot water. The resultant solid was cut into smaller pieces, washed well with water and methanol, and dried in a heated vacuum oven.

Analysis of the polymer showed it to contain 1.48 weight percent sulfur and 1.82 weight percent sodium. On the basis of these analyses, the sodium sulfonate containing polymer contains about 7.5 sodium sulfonate groups per 100 monomer units.

Attempts to compression mold the sodium sulfonate polymer at 400°F. were completely unsuccessful. The polymer did not flow or fuse completely, and was brittle and unattractive.

100 parts of an oil (described in Example 2) was mixed with 100 parts of polymer by dissolving both in a benzene-methanol mixture containing 2,6-di-t-butyl catechol and evaporating the solvent in a shallow pan under vacuum. A flexible material resulted but a cohesive film could not be produced by compression molding at 400°F. Thus, in the absence of an ionic domain plasticizer the chain plasticized composition could not be plasticized.

10 Grams of the sodium sulfonate polymer and 10 grams of an oil (described in Example 2) were dissolved in 400 ml. benzene containing 5 ml. methanol and a small amount of 2,6-di-t-butyl catechol antioxidant. As a plasticizer for the ionic domains, 0.2 g. of zinc stearate was added. The resulting solution was evaporated under vacuum in a shallow pan. The resulting material was clear, tough, and flexible. A small sample was compression molded at 400°F. for 2 minutes, and a good film was obtained. The plasticized composition had a tensile strength of 626 psi. and an elongation of 270%.

This example clearly demonstrates that chain plasticization on the one hand, and ionic domain plasticization on the other hand can be independently controlled.

EXAMPLES 7–33

Preparation of Sodium Sulfonate Polystyrenes

The starting polystyrene in the preparations was a commercial resin possessing an intrinsic viscosity of 0.80 in toluene at 25°C., a number average molecular weight of 106,000, and a weight average molecular weight of 288,000 (molecular weights obtained by gel permeation chromatography).

The sulfonation reagent used in these preparations was "acetyl sulfate" prepared by mixing concentrated sulfuric acid with acetic anhydride. Reagent preparation: To 395.7 ml. of 1,2-dichloroethane was added 76.3 ml. (82.4 g., 0.808 mole) of acetic anhydride. The solution was cooled to below 10°C., and 28.0 ml. of 95% sulfuric acid (48.9 g. sulfuric acid, 0.498 mole) was added. A clear solution resulted. Molarity of acetyl sulfate = 0.996.

104 Grams of polystyrene was dissolved in 490 ml. 1,2-dichloroethane. The solution was heated to 50°C., and 10 ml. of 0.996 molar acetyl sulfate (9.96 meq.) was added. The solution was stirred for 60 minutes at 50°C. Reaction was terminated by the addition of 25 ml. alcohol, and the sulfonated polymer was isolated by steam stripping. The polymer mass was pulverized with water in a Waring blender, filtered, washed and vacuum oven dried. The partially dried polymer was slurried in 950 ml. toluene and 50 ml. of ethyl alcohol, and the slurry refluxed to remove water and effect solution of the polymer. The resultant solution was cooled to room temperature and titrated to an alizarinthymophthalein end-point with 1.0 normal sodium hydroxide (6.5 ml.). The neutralized polymer was isolated by steam stripping, pulverized and washed with methanol in a Waring blender, filtered, methanol washed, and vacuum oven dried. Yield of sodium sulfonate polymer was 98.2 g. Analysis showed the polyer to contain 0.10 weight percent sulfur. On the basis of this analysis, the sodium sulfonate polystyrene contains 0.32 sodium sulfonate groups per 100 monomer units.

Two other sulfonations and neutralizations with sodium hydroxide were effected according to the procedure above except that 30 ml. and 50 ml. of acetyl sulfate reagent solution were used. Analyses showed the sodium sulfonate polystyrenes to contain 0.76 and 1.29 weight percent sulfur which corresponds to 2.53 and 4.37 sodium sulfonate groups, respectively, per 100 monomer units.

Plasticization of Sodium Sulfonate Polystyrenes

Each of the sodium sulfonate polystyrenes described above were plasticized with three different plasticizers (dioctyl phthalate, dihexyl phthalate, and dibutyl phthalate) at three different levels (100 parts, 75 parts, and 50 parts plasticizer per 100 parts of polymer).

To facilitate intimate interaction between polymer and plasticizer, the requisite amount of polymer and plasticizer were weighed into a flask and dissolved in sufficient solvent (benzene containing 10 volume percent methanol) to prepare a solution of 10 parts (polymer + plasticizer) per 100 of solvent. The resulting homogeneous solutions were then evaporated to dryness and then further dried in a vacuum oven at 60°C overnight. Clear, flexible sample pads were obtained by compression molding at temperatures of 285°F (140.6°C) to 335°F (168.3°C) for 2 minutes at a pressure of 10 tons per square inch. Conventional dumbbell-shaped samples were cut, and stress-strain data obtained on an Instron Test Machine using a crosshead speed of 2 inches per minute. The tensile strengths and elongations at break for each sample are recorded in Table I.

TABLE I

TENSILE DATA FOR PLASTICIZED SULFONATED POLYSTYRENES

| Example | Percent SO$_3$Na | Plasticizer | Parts Plasticizer per 100 pts Polymer | Tensile Strength | Elongation |
|---|---|---|---|---|---|
| 7 | 4.37 | DOP[1] | 100 | 980 | 210 |
| 8 | 4.37 | DOP | 75 | 1271 | 233 |
| 9 | 4.37 | DOP | 50 | 2261 | 100 |
| 10 | 4.37 | DHP[2] | 100 | 638 | 557 |
| 11 | 4.37 | DHP | 75 | 960 | 343 |
| 12 | 4.37 | DHP | 50 | 1884 | 230 |
| 13 | 4.37 | DBP[3] | 100 | 266 | 753 |
| 14 | 4.37 | DBP | 75 | 754 | 492 |
| 15 | 4.37 | DBP | 50 | 1469 | 197 |
| 16 | 2.53 | DOP | 100 | 473 | 563 |
| 17 | 2.53 | DOP | 75 | 981 | 410 |
| 18 | 2.53 | DOP | 50 | 1520 | 180 |
| 19 | 2.53 | DHP | 100 | 298 | 683 |
| 20 | 2.53 | DHP | 75 | 509 | 450 |
| 21 | 2.53 | DHP | 50 | 1394 | 237 |
| 22 | 2.53 | DBP | 100 | 166 | 643 |
| 23 | 2.53 | DBP | 75 | 558 | 453 |
| 24 | 2.53 | DBP | 50 | 967 | 277 |
| 25 | 0.32 | DOP | 100 | 30 | 885 |
| 26 | 0.32 | DOP | 75 | 79 | 872 |
| 27 | 0.32 | DOP | 50 | 560 | 360 |
| 28 | 0.32 | DHP | 100 | 6 | 1100 |
| 29 | 0.32 | DHP | 75 | 22 | 705 |
| 30 | 0.32 | DHP | 50 | 115 | 413 |
| 31 | 0.32 | DBP | 100 | 1 | 1050 |
| 32 | 0.32 | DBP | 75 | 12 | 1050 |
| 33 | 0.32 | DBP | 50 | 266 | 473 |

[1] Dioctyl phthalate
[2] Dihexyl phthalate
[3] Dibutyl phthalate

These data demonstrate that polystyrene with sulfonate levels of about 0.3 to 4.4 mole percent can be effectively plasticized with phthalate plasticizers, and compression molded to yield tough, clear, flexible products. As the sulfonate level is diminished in the polymer, there is a decrease in tensile strength of the plasticized products. However even at the low level of 0.32 mole percent sulfonate context, the plasticized products still possess significant tensile properties. With increased plasticizer content there is a substantial increase in elongation indicating the plasticized products are more elastomeric. Finally as more polar plasticizers are employed (polarity decreases in the order DBP>DHP>DOP) there is a concomitant decrease in tensile strength in the plasticized systems. This observation is of considerable importance for its permits a control over the amount and perfection of the ionic crosslinking, by (1) control of sulfonate level, (2) amount of plasticizer added, (3) structure (or polarity) of plasticizer.

EXAMPLES 34-47

Starting with a common sulfonated polystyrene four different salts were made, i.e., the sodium, potassium, cesium, and barium salts. The basic sulfonic acid was prepared as described in Examples 7-33 from 416 g. of polystyrene and 120 ml. of 0.996 acetyl sulfate solution. Analysis of the isolated and dried polymer showed it to contain 0.85 weight percent sulfur which corresponds to 2.83 sulfonic acid groups per 100 monomer units.

The sodium salt was prepared by dissolving 80 g. of sulfonated polystyrene in 400 ml. benzene and 20 ml. methanol and neutralizing the solution with 1.07 N NaOH in absolute ethanol. The polymer was worked up as described above. Analysis showed the sodium-sulfonated polystyrene to contain 0.75 weight percent sulfur corresponding to 2.46 sodium sulfonate groups per 100 monomer units.

The potassium salt was prepared just as the sodium salt except that 1.03 N KOH in absolute ethanol was used in the neutralization. Weight percent sulfur = 0.71, corresponding to 2.35 potassium sulfonate groups per 100 monomer units.

To prepare the cesium salt 7.456 g. of cesium hydroxide was diluted to 50 ml. (0.994 N) with a 24 water-76 ethanol solution (by volume). 80 grams of sulfonated polystyrene was dissolved in 700 ml. benzene-20 ml. ethanol, and 22.2 ml. of 0.994 N cesium hydroxide (22.06 meq.) was added slowly. The resultant cloudy solution was worked up as described above. Weight percent sulfur = 0.75, corresponding to 2.49 cesium sulfonate groups per 100 monomer units.

To prepare the barium salt, a solution of 0.993 N barium acetate in 50—50 water-ethanol by volume was use. A solution of 80 g. of the sulfonated polystyrene in 700 ml. benzene-20 ml. ethanol was treated with 22.2 ml. of 0.993 N barium acetate (22.06 meq.). The resultant solution was cloudy and very thick. The barium sulfonated polystyrene was worked up as described above. Weight percent sulfur = 0.83, corresponding to 2.73 barium sulfonate groups per 100 monomer units.

Each of the four different metal sulfonate polystyrenes were plasticized with dialkyl phthalates according to procedures described in Examples 7–33 and to the levels shown in Table II. Samples for testing were compression molded at temperatures of 285°F. (140.6°C.). to 400°F. (204.4°C.). The tensile properties of the plasticized metal sulfonate containing polystyrenes are given in Table II.

The results show that flexible products with excellent properties can be obtained with sulfonate containing polystyrenes when the metal is sodium, potassium, cesium, or barium.

EXAMPLES 48–50

While those plasticized products of Examples 7–47 could be compression molded to yield clear, tough, flexible products, it was observed in some cases, such as with the barium salt, especially at lower levels of a relatively non-polar plasticizer such as DOP, the molding operation was conducted with some difficulty unless higher molding temperatures were employed.

To the barium sulfonate polystyrene described in Examples 34–47 was added a plasticizer consisting of 95% dioctyl phthalate and 5% N-ethyl toluene sulfonamide (mixed o- and p-isomers) to levels of 50, 75, and 100 parts per 100 parts of polymer according to previously described procedures. These plasticized compositions were compression molded, and they appeared to flux more readily than equivalent dioctyl phthalate compositions containing no N-ethyl toluene sulfonamide. The tensile properties of the compositions are given in Table III.

The tensile data show that not only do the compositions containing a small amount of nonvolatile ionic domain plasticizer process more readily but the molded materials therefrom have superior properties.

TABLE III

| Example | % Sulfonate | Plasticizer | Parts Plasticizer per 100 pts Polymer | Physical Properties At Break Tensile Strength | Elongation |
| --- | --- | --- | --- | --- | --- |
| 48 | 3 | DOP (95) + ETS (5) | 100 | 703 | 410 |
| 49 | 3 | DOP (95) + ETS (5) | 75 | 1007 | 235 |
| 50 | 3 | DOP (95) + ETS (5) | 50 | 2025 | 213 |

What is claimed is:

1. A flexible composition comprising:
   a normally plastic polymer sulfonated to about 0.2 to about 10 mole percent sulfonate, said plastic polymer being substantially amorphous and having a softening point between about 25°C and 260°C; and
   b. about 20 to about 500 parts per hundred by weight based on the sulfonated plastic polymer of a poly-

TABLE II

| Example | Metal | Plasticizer | Parts Plasticizer per 100 Polymer | Physical Properties at Break Tensile Strength | Elongation |
| --- | --- | --- | --- | --- | --- |
| 34 | Na | DOP | 100 | 1212 | 253 |
| 35 | Na | DOP | 50 | 321 | 477 |
| 36 | K | DHP | 75 | 553 | 520 |
| 37 | Ba | DOP | 100 | 565 | 600 |
| 38 | Ba | DOP | 75 | 685 | 480 |
| 39 | Ba | DOP | 50 | 1196 | 280 |
| 40 | Ba | DHP | 100 | 439 | 647 |
| 41 | Ba | DHP | 75 | 762 | 460 |
| 42 | Ba | DHP | 50 | 1133 | 210 |
| 43 | Ba | DBP | 100 | 843 | 380 |
| 44 | Ba | DBP | 75 | 551 | 527 |
| 45 | Cs | DOP | 100 | 543 | 570 |
| 46 | Cs | DHP | 75 | 646 | 455 |
| 47 | Cs | DBP | 50 | 799 | 333 | mer chain plasticizer, said plasticizer being a normally liquid compound having a boiling point of at least 120°C.

2. The composition of claim 1 wherein the chain plasticizer is a phosphate ester.

3. The composition of claim 1 wherein the sulfonate group is neutralized with a compound selected from the group consisting of (1) ammonia, (2) primary amines, (3) secondary amines, (4) tertiary amines, and (5) a metal compound wherein the metal compound is a salt, hydroxide, oxide, alkoxide or carboxylate wherein the metal is selected from the group consisting of lead, tin, antimony and metals of Groups IA, IIA, IB and IIB of the Periodic Table of the Elements and (6) mixtures thereof.

4. The composition of claim 3 wherein the sulfonate content is about 0.5 to about 6 mole percent and the chain plasticizer is present at about 25 to about 250 parts per hundred based on the polymer.

5. The composition of claim 4 wherein the number of sulfonate groups per 100 monomer units is from about 1.0 to about 3 and the chain plasticizer is included in the composition at about 30 to about 100 parts per hundred.

6. The composition of claim 3 wherein the plastic polymer is a polymer of at least one monomer selected from the group consisting of vinyl aromatics, vinyl acylates, alkyl methacrylates, vinyl cyanides and mixtures thereof.

7. The composition of claim 6 wherein the chain plasticizer is a normally liquid organic compound having a boiling point of at least 120°C.

8. The composition of claim 6 wherein the plastic polymer is a polymer of at least one monomer selected from the group consisting of styrene, t-butyl styrene, vinyl toluene, chlorostyrene, dichlorostyrene, alpha-methyl styrene and mixtures thereof.

9. The composition of claim 8 wherein the chain plasticizer is a normally liquid organic compound having a boiling point of at least 120°C.

10. The composition of claim 6 wherein the polymer is the polymerization product of at least two of said monomers.

11. The composition of claim 3 wherein the plastic polymer is the polymerization reaction product of (1) at least one monomer selected from the group consisting of styrene, t-butyl styrene, vinyl toluene, chlorostyrene, dichlorostyrene and alpha-methyl styrene and (2) a diene wherein the mole percent unsaturation of the polymer is about 1 to about 15 mole percent.

12. The composition of claim 11 wherein the plasticizer is a normally liquid organic compound having a boiling point of at least 120°C.

13. The composition of claim 11 wherein the diene is isoprene, butadiene or 5-ethylidene-2-norbornene.

14. The composition of claim 13 wherein the monomer is t-butylstyrene, chlorostyrene or dichlorostyrene.

15. The composition of claim 3 wherein the polymer is polystyrene and the chain plasticizer is a dialkyl phthalate wherein the alkyl group comprises about 1 to about 10 carbon atoms.

16. The composition of claim 15 wherein the phthalate is dibutyl phthalate, dihexyl phthalate, dioctyl phthalate, or mixtures thereof.

17. The composition of claim 3 wherein the polymer is t-butyl styrene and the chain plasticizer is a dialkyl phthalate wherein the alkyl groups comprise at least 5 carbon atoms.

18. The composition of claim 3 wherein the polymer is t-butyl styrene and the chain plasticizer is a non-volatile normally liquid hydrocarbon with a solubility parameter of less than 9.0.

19. The composition of claim 18 wherein the chain plasticizer is a rubber process oil.

20. The composition of claim 3 wherein the polymer is t-butyl styrene and the chain plasticizer is an organic acid ester comprising at least 10 carbon atoms.

21. The composition of claim 20 wherein the ester is a polyester of an aliphatic glycol and an aliphatic dibasic acid wherein the ratio of methylene groups to oxygen is at least 5.

22. The composition of claim 3 wherein a domain plasticizer at a level of about 1 to about 50 weight percent based on sulfonated polymer is included, said domain plasticizer being a compound which acts to reversibly disrupt the association of the sulfonate groups at the temperature of forming the flexible compositions and is inactive at the temperature of use of the flexible compositions.

23. The composition of claim 22 wherein the domain plasticizer is a fugitive plasticizer.

24. The composition of claim 23 wherein the domain plasticizer is an alcohol, an amine or a mercaptan having a boiling point of less than 125° C.

25. The composition of claim 22 wherein the domain plasticizer has a boiling point of greater than 120°C.

26. The composition of claim 25 wherein the domain plasticizer is a normally liquid organic compound having a solubility parameter of at least 9.5

27. The composition of claim 25 wherein the domain plasticizer is a compound containing functional groups with a bond moment of at least 0.6 Debyes.

28. The composition of claim 25 wherein the domain plasticizer is an alcohol, a carboxylic acid ester, a carboxylic acid amide, an amine, an alkylated area, guanidine, a hydrocarbon-substituted guanidine, a sulfonamide, a sulfone, a sulfonate, a phosphate, a phosphonate, a phosphonamide, or a phosphoramide.

29. The composition of claim 28 wherein the domain plasticizer is (1) N-ethyltoluenesulfonamide, (2) ditolyl guanidine, or (3) a metal compound wherein the metal compound is a carboxylate, sulfonate or phosphonate and the metal is lead, tin, antimony or a metal of Groups IA, IIA, IB, IIB of the Periodic Table of the Elements.

30. The composition of claim 29 wherein the metal carboxylate is a metal stearate.

31. The composition of claim 30 wherein the stearate is zinc stearate.

32. The composition of claim 3 wherein the polymer is a vinyl acetate copolymer wherein vinylacetate is copolymerized with at least one monomer selected from the group consisting of vinyl aromatics, dienes and mixtures thereof.

33. The composition of claim 22 wherein the vinyl aromatic is styrene.

34. The composition of claim 32 wherein the diene is butadiene, isoprene or 5-ethylidene-2-norbornene.

35. The composition of claim 32 wherein the chain plasticizer is dinonyl adipate, triethyl citrate, dioctyl fumarate, dibutyl maleate, tributyl phosphate, tricresyl phosphate, diethyl phthalate, dibutyl phthalate, dicyclohexyl phthalate or mixtures thereof.

36. The composition of claim 3 wherein the polymer is methyl methacrylate copolymerized with a minor amount of a second monomer wherein said monomer is a vinyl aromatic or a diene.

37. The composition of claim 36 wherein the vinyl aromatic is styrene and the diene is butadiene, isoprene or 5-ethylidene-2-norbornene.

38. The composition of claim 3 wherein the metal is sodium, potassium, calcium or barium.

39. The composition of claim 3 wherein the polymer is a copolymer of styrene and a second monomer selected from the group consisting of alkyl acrylates or alkyl methacrylates.

40. The composition of claim 39 wherein the second monomer is methylmethacrylate.

41. The composition of claim 3 wherein the polymer is a vinyl acetate copolymer wherein vinylacetate is copolymerized with a second monomer wherein said second monomer is a sulfonic acid or sulfonate compound.

42. The composition of claim 41 wherein the second monomer is 2-sulfo-ethyl methacrylate.

43. The composition of claim 41 wherein the chain plasticizer in dinonyl adipate, triethyl citrate, dioctyl fumarate, dibutyl maleate, tributyl phosphate, tricresyl phosphate diethyl phthalate, dibutyl phthalate, dicyclohexyl phthalate or mixtures thereof.

44. A processable composition comprising
  a. a normally plastic polymer sulfonated to about 0.2 to about 10 mole percent sulfonate, said plastic polymer being substantially amorphous and having a softening point between about 25°C. and 260°C.;
  b. about 20 to about 500 parts per hundred by weight based on the sulfonated plastic polymer of a polymer chain plasticizer; and
  c. a fugitive domain plasticizer, said fugitive plasticizer being included at about 1 to about 50 weight percent based on sulfonated polymer, said fugitive domain plasticizer being a compound which acts to disrupt the association of the sulfonate groups at the temperature of forming said processable composition and has a boiling point of less than 120°C.; whereby removal of the fugitive plasticizer converts the processable composition to a flexible substantially intractable composition.

45. The composition of claim 44 wherein the domain plasticizer is an alcohol, an amine or a mercaptan having a boiling point of less than 125°C.

46. The composition of claim 44 wherein the fugitive plasticizer is methyl alcohol, isopropyl alcohol, n-butyl alcohol, triethyl phosphate, ethyl amine, triethyl amine, or ethane thiol.

47. The composition of claim 44 wherein the fugitive plasticizer is included at about 1 to about 20 weight percent based on the polymer.

* * * * *